(12) United States Patent
Lee et al.

(10) Patent No.: US 12,185,896 B2
(45) Date of Patent: Jan. 7, 2025

(54) RAIL DEVICE FOR DISHWASHER

(71) Applicant: SEGOS CO., LTD., Incheon (KR)

(72) Inventors: Doo Myun Lee, Incheon (KR); Duc Hoi Kim, Incheon (KR); Sai Ryun Kim, Incheon (KR); Ro Hee Lee, Incheon (KR); Byeol Kim, Seoul (KR)

(73) Assignee: SEGOS CO., LTD., Incheon (KR)

( * ) Notice: Subject to any disclaimer, the term of this patent is extended or adjusted under 35 U.S.C. 154(b) by 131 days.

(21) Appl. No.: 17/926,404

(22) PCT Filed: Jul. 27, 2020

(86) PCT No.: PCT/KR2020/095095
§ 371 (c)(1),
(2) Date: Nov. 18, 2022

(87) PCT Pub. No.: WO2021/235642
PCT Pub. Date: Nov. 25, 2021

(65) Prior Publication Data
US 2023/0190073 A1 Jun. 22, 2023

(30) Foreign Application Priority Data
May 19, 2020 (KR) .................. 10-2020-0059739

(51) Int. Cl.
*A47L 15/50* (2006.01)
*F16C 29/04* (2006.01)

(52) U.S. Cl.
CPC ............ *A47L 15/507* (2013.01); *F16C 29/04* (2013.01); *F16C 2314/72* (2013.01)

(58) Field of Classification Search
CPC ..... A47L 15/507; A47B 88/487; F16C 29/04; F16C 2314/00; F16C 2314/72
See application file for complete search history.

(56) References Cited

U.S. PATENT DOCUMENTS 5,345,959 A    9/1994 Matteson
5,730,301 A *  3/1998 Welch ..................... A47L 15/50
                                                  211/41.1

(Continued)

FOREIGN PATENT DOCUMENTS

CN    205126159 U    4/2016
DE    2362091 A1 *  6/1975

(Continued)

OTHER PUBLICATIONS

International Search Report of PCT/KR2020/095095 dated Feb. 2, 2021 [PCT/ISA/210].

(Continued)

*Primary Examiner* — Phillip A Johnson
(74) *Attorney, Agent, or Firm* — Sughrue Mion, PLLC

(57) ABSTRACT

Provided is a rail device for a dishwasher, including a guide main body part; an upper support roller part coupled to one side of the guide main body part to be rotatable with respect to a central axis; a lower support roller part coupled to one side of the guide main body part to be rotatable with respect to a central axis; a guide rail part extendedly formed along the sliding direction with one side inserted into a space between the upper support roller part and the lower support roller part; and a rack roller part having one side inserted into the guide rail part and the other side coupled to one surface inside the main body of the dishwasher or coupled to a sliding basket.

12 Claims, 7 Drawing Sheets

(56) References Cited

U.S. PATENT DOCUMENTS

2012/0139399 A1    6/2012   McDaniel
2018/0035866 A1*   2/2018   Nowell, Jr. ......... A47L 15/4225
2018/0192852 A1    7/2018   Hansen

FOREIGN PATENT DOCUMENTS

| | | |
|---|---:|---|
| EP | 2 436 298 A2 | 4/2012 |
| GB | 2 290 949 A | 1/1996 |
| KR | 20-1994-0001918 Y1 | 3/1994 |
| KR | 10-1158584 A | 6/2012 |
| KR | 10-2020-0007352 A | 1/2020 |

OTHER PUBLICATIONS

European Search Report dated May 24, 2024 in Application No. 20936437.1.
Chinese Office Action dated May 9, 2024 in Application No. 20208010182.2.

\* cited by examiner (a)

(b)

(a)

(b)

(a)

(b)

RAIL DEVICE FOR DISHWASHER

CROSS REFERENCE TO RELATED APPLICATIONS

This application is a National Stage of International Application No. PCT/KR2020/095095 filed on Jul. 27, 2020, claiming priority based on Korean Patent Application No. 10-2020-0059739 filed on May 19, 2020, the entire disclosures of which are incorporated herein by reference.

TECHNICAL FIELD

The present invention relates to a rail device for a dishwasher. More specifically, the present invention relates to a rail device for a dishwasher having a structure capable of absorbing the change in a width movement of a sliding basket by securing an amount of clearance between left and right sides.

BACKGROUND ART

A dishwasher is a kitchen appliance that can automatically wash and dry dishes, cups, and cutlery. The dishwasher works by washing dishes using a strong water stream after soaking food in hot steam and detergent, and the performance is generally evaluated based on how perfectly a high-pressure water stream is sprayed without a missing part to wash out the food.

The dishwasher as described above is a home appliance which helps making our life more convenient and reduces housework hours like the existing air purifiers, dryers and steam closets. Recently, the sales of dishwashers are increasing around the globe including Korea.

Dishes, cutlery, etc. to be washed in the dishwasher may be put in through a sliding basket which slides in and out of the dishwasher, and the above sliding basket generally slides in the entry/exit direction by the guide of the rail device for dishwasher fixedly coupled to an inner wall of the dishwasher.

However, when the conventional rail device is applied to a dishwasher, a water stream of high pressure is applied at various angles inside the dishwasher, thereby causing horizontal movement and impact to the sliding basket in the left and right sides of the guide rail. Accordingly, the rail device applied to the dishwasher needs to have a function securing the amount of clearance between the left and right sides or absorbing the horizontal movement in correspondence thereto.

PRIOR ART LITERATURE (Patent Document 1) Korean Patent No. 10-1158584 (Jun. 14, 2012)

DETAILED DESCRIPTION OF INVENTION

Technical Task

The present invention aims at solving the problems of prior art as described above, and it is an object of the present invention to provide a rail device for a dishwasher having a structure capable of absorbing the change in the width movement of the sliding basket by securing the amount of clearance between left and right sides.

Means for Solving Technical Task

In order to achieve the above object, an aspect of the present invention provides a rail device for a dishwasher, comprising a guide main body part; an upper support roller part coupled to one side of the guide main body part to be rotatable with respect to a central axis; a lower support roller part coupled to one side of the guide main body part to be rotatable with respect to a central axis; a guide rail part extendedly formed along the sliding direction with one side inserted into a space between the upper support roller part and the lower support roller part; and a rack roller part having one side inserted into the guide rail part and the other side coupled to one surface inside the main body of the dishwasher or coupled to a sliding basket, wherein the rack roller part comprises a rack roller main body part inserted into the guide rail part to be rotatable with respect to the central axis; a rack member part fixedly coupled to one surface inside the main body of the dishwasher; and a rack coupling part penetrating and coupling the center of the rack roller main body part and one side of the rack member part, wherein the rack coupling part couples the rack roller main body part and the rack member part to be spaced apart so that the rack roller part moves horizontally by a predetermined distance.

According to an embodiment of the present invention, at least one of the upper support roller part, the lower support roller part and the rack roller part may comprise a bearing ball thereinside.

According to an embodiment of the present invention, one or more bearing balls may be disposed in a space between an inner circumference surface of the rack roller main body part and an outer circumference surface of the rack coupling part, and be spaced apart from the inner circumference surface of the rack roller main body part so that the rack roller part moves horizontally by a predetermined distance.

According to an embodiment of the present invention, a track part on which the bearing ball can be seated may be provided in any one of the inner circumference surface of the rack roller main body part and the outer circumference surface of the rack coupling part.

According to an embodiment of the present invention, a rail device for a dishwasher may comprise a guide main body part; an upper support roller part coupled to one side of the guide main body part to be rotatable with respect to a central axis; a lower support roller part coupled to one side of the guide main body part to be rotatable with respect to a central axis; a guide rail part extendedly formed along the sliding direction with one side inserted into a space between the upper support roller part and the lower support roller part; and a rack roller part having one side inserted into the guide rail part and the other side coupled to one surface inside the main body of the dishwasher or coupled to a sliding basket, wherein the rack roller part comprises a rack roller main body part inserted into the guide rail part to be rotatable with respect to the central axis; a rack member part fixedly coupled to one surface inside the main body of the dishwasher; and a rack coupling part penetrating and coupling the center of the rack roller main body part and one side of the rack member part, and wherein the upper support roller part comprises a first roller frame part rotatable with respect to the central axis, whose circumference surface is formed to correspond to the upper guide part; and a first roller coupling part penetrating and coupling the center of the first roller frame part and one side of the guide main body part, wherein the first roller coupling part couples the first roller frame part and the guide main body part to be spaced apart so that the upper support roller part moves horizontally by a predetermined distance.

According to an embodiment of the present invention, at least one of the upper support roller part, the lower support roller part and the rack roller part may comprise a bearing ball thereinside.

According to an embodiment of the present invention, one or more bearing balls may be disposed in a space between an inner circumference surface of the first roller frame part and an outer circumference surface of the first roller coupling part, and be spaced apart from the inner circumference surface of the first roller frame part so that the upper support roller part moves horizontally by a predetermined distance.

According to an embodiment of the present invention, a track part on which the bearing ball can be seated may be provided in any one of the inner circumference surface of the first roller frame part and the outer circumference surface of the first roller coupling part.

According to an embodiment of the present invention, a rail device for a dishwasher may comprise a guide main body part; an upper support roller part coupled to one side of the guide main body part to be rotatable with respect to a central axis; a lower support roller part coupled to one side of the guide main body part to be rotatable with respect to a central axis; a guide rail part extendedly formed along the sliding direction with one side inserted into a space between the upper support roller part and the lower support roller part; and a rack roller part having one side inserted into the guide rail part and the other side coupled to one surface inside the main body of the dishwasher or coupled to a sliding basket, wherein the rack roller part comprises a rack roller main body part inserted into the guide rail part to be rotatable with respect to the central axis; a rack member part fixedly coupled to one surface inside the main body of the dishwasher; and a rack coupling part penetrating and coupling the center of the rack roller main body part and one side of the rack member part, and wherein the lower support roller part comprises a second roller frame part rotatable with respect to the central axis, whose circumference surface is formed to correspond to the lower guide part; and a second roller coupling part penetrating and coupling the center of the second roller frame part and one side of the guide main body part, wherein the second roller coupling part couples the second roller frame part and the guide main body part to be spaced apart so that the lower support roller part moves horizontally by a predetermined distance.

According to an embodiment of the present invention, at least one of the upper support roller part, the lower support roller part and the rack roller part may comprise a bearing ball thereinside.

According to an embodiment of the present invention, one or more bearing balls may be disposed in a space between an inner circumference surface of the second roller frame part and an outer circumference surface of the second roller coupling part, and be spaced apart from the inner circumference surface of the second roller frame part so that the lower support roller part moves horizontally by a predetermined distance.

According to an embodiment of the present invention, a track part on which the bearing ball can be seated may be provided in any one of the inner circumference surface of the second roller frame part and the outer circumference surface of the second roller coupling part.

Effect of Invention

According to an aspect of the present invention, the structural stability and operational reliability of the dishwasher may be achieved by responding to the width change to the left and right sides generated during the sliding of in and out of the dishwasher or operating process.

Also, the track part on which the bearing is seated is provided in the outer circumference surface of the shaft of a rack roller part and a support roller part. Thus, even if there is no additional retainer holding the bearing, the rack roller part and support roller part smoothly rotate, thereby improving operability and reducing manufacturing costs due to the reduction of the number of parts.

The effects of the present invention are not limited to the above-mentioned effects, and it should be understood that the effects of the present invention include all effects that could be inferred from the configuration of the invention described in the detailed description of the invention or the appended claims.

DETAILED MEANS FOR CARRYING OUT THE INVENTION

Figure 1:
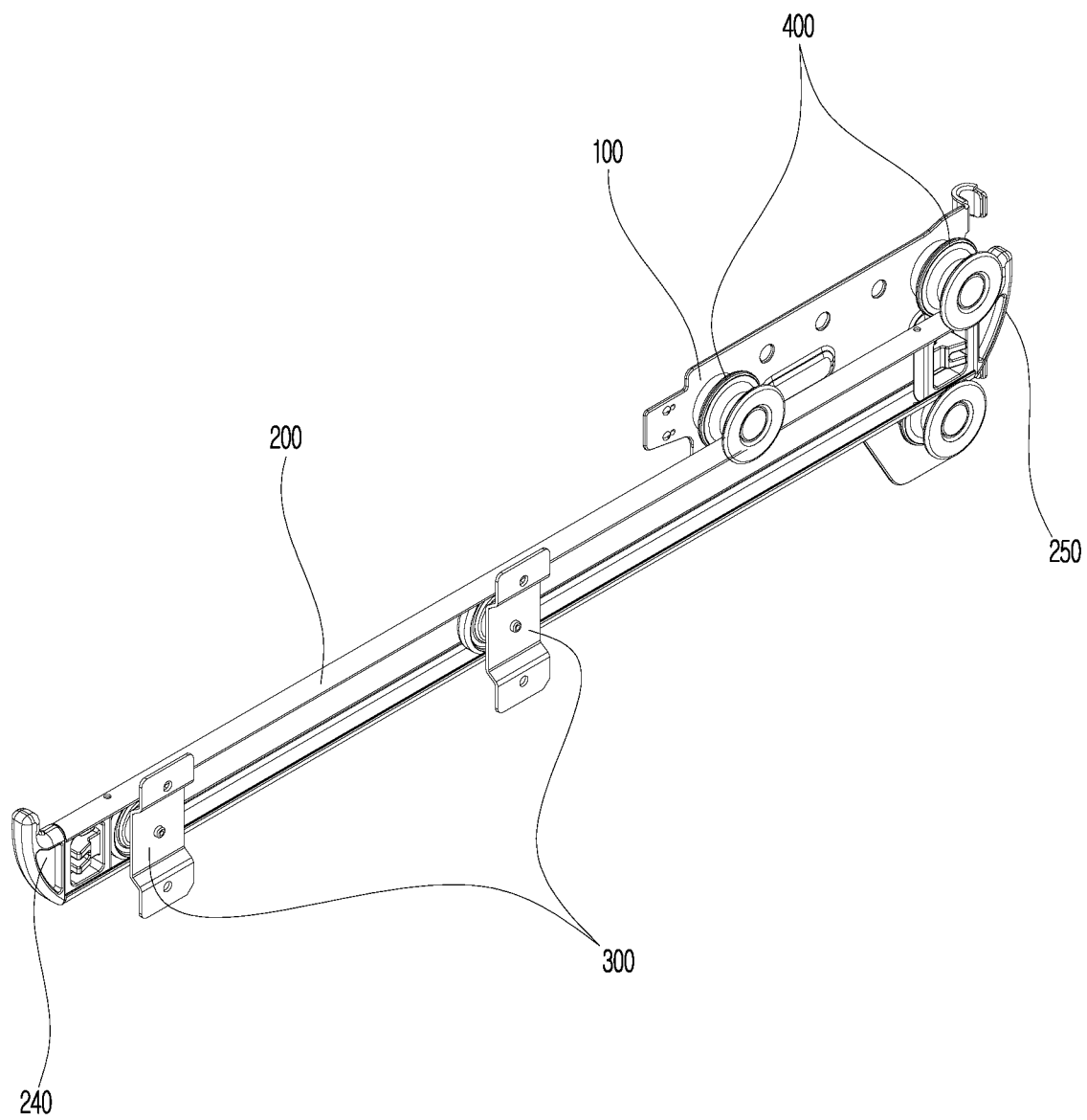
FIG. 1 is a perspective view of a rail device for a dishwasher according to an embodiment of the present invention.

Hereinafter, the present invention will be explained with reference to the accompanying drawings. The present invention, however, may be modified in various different ways, and should not be construed as limited to the embodiments set forth herein. Also, in order to clearly explain the present invention in the drawings, portions that are not related to the present invention are omitted, and like reference numerals are used to refer to like elements throughout the specification.

Throughout the specification, it will be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

Hereinafter, the embodiments of the present invention will be described in detail with reference to the accompanying drawings.

Figure 2:
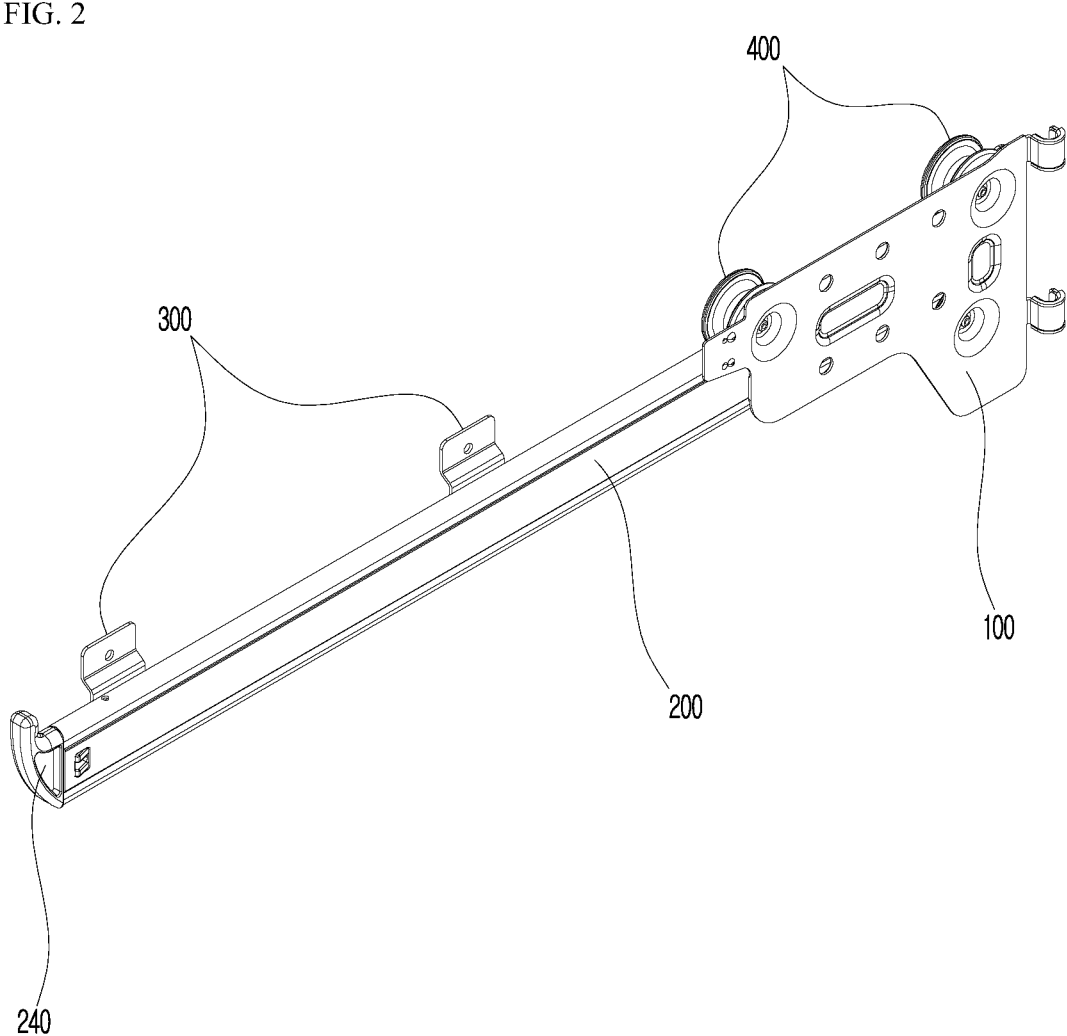
FIG. 2 is a perspective view of FIG. 1 seen from another angle.
Figure 3:
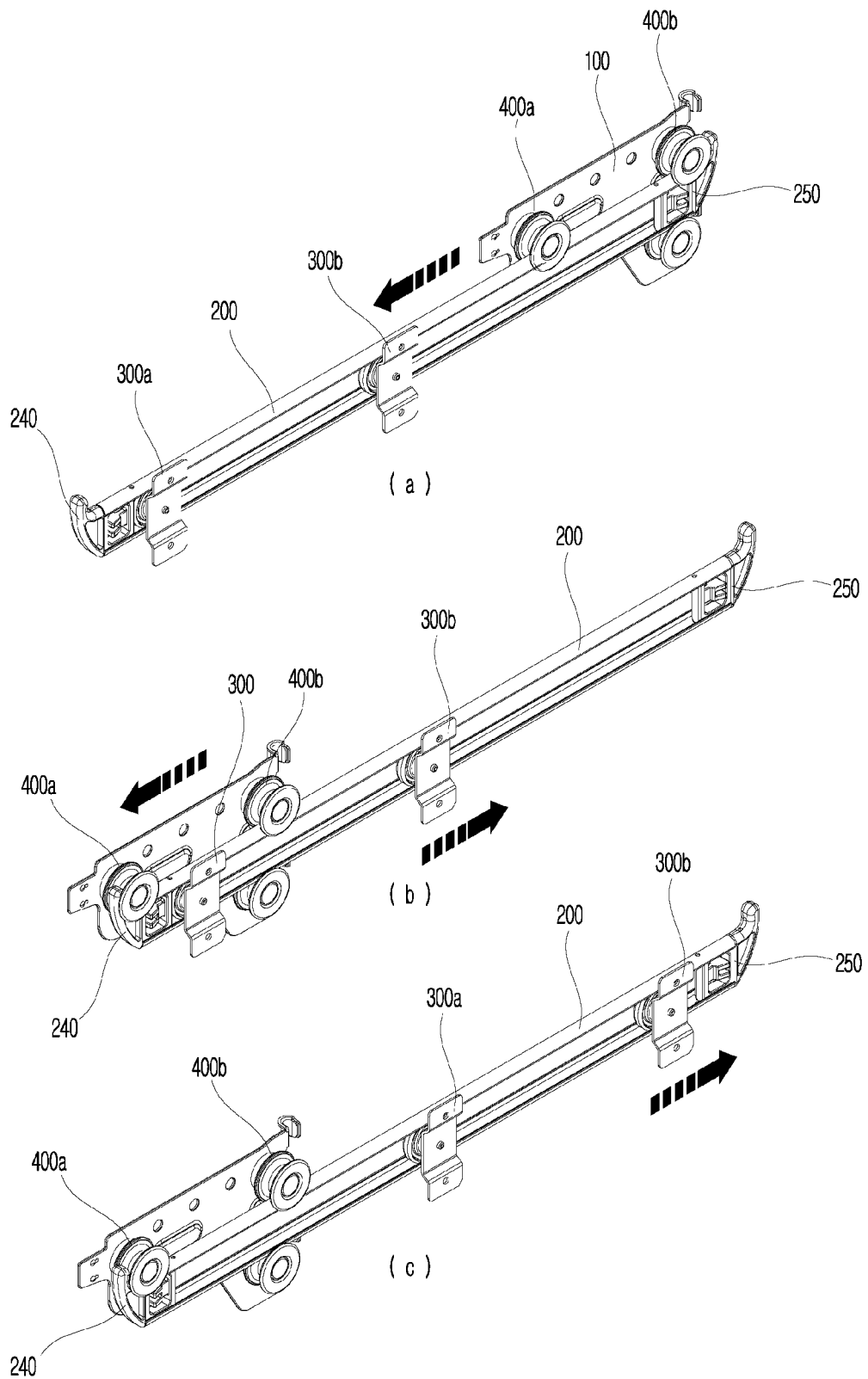
FIG. 3 is a flowchart illustrating the sliding in the drawing-out direction of a rail device for a dishwasher according to an embodiment of the present invention.
Figure 4:
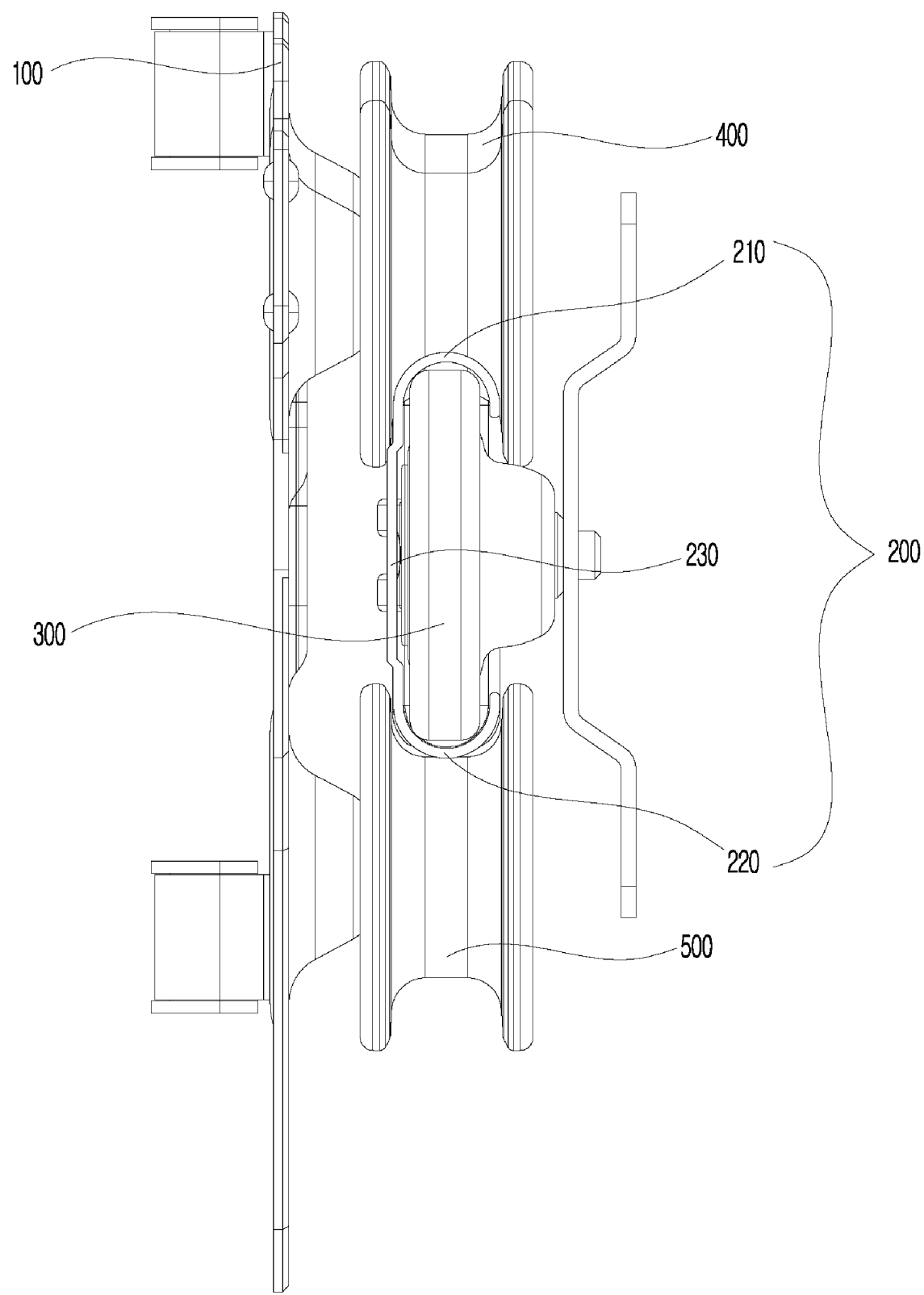
FIG. 4 is a side view of a rail device for a dishwasher according to an embodiment of the present invention.

FIG. 1 is a perspective view of a rail device for a dishwasher according to an embodiment of the present invention, FIG. 2 is a perspective view of FIG. 1 seen from another angle, FIG. 3 is a flowchart illustrating the sliding in the drawing-out direction of a rail device for a dishwasher according to an embodiment of the present invention, and FIG. 4 is a side view of a rail device for a dishwasher according to an embodiment of the present invention.

As illustrated in FIGS. 1 to 4, the rail device 1000 for dishwasher according to the present invention comprises a guide main body part 100, an upper support roller part 400, a lower support roller part 500, a rack roller part 300, and a guide rail part 200.

The rail device 1000 for dishwasher according to the present invention may be implemented in the form of a first embodiment wherein the guide main body part 100 is coupled to the sliding basket to slide integrally therewith and the rack roller part 300 is coupled to one surface inside the dishwasher, or in the form of a second embodiment wherein the guide main body part 100 is coupled to one surface inside the dishwasher and the rack roller part 300 is coupled to the sliding basket to slide integrally therewith.

Hereinafter, for the sake of convenience in explanation, the present invention will be explained focusing on the first embodiment. However, it is obvious that various embodiments described in the following may be applied similarly to the second embodiment of the present invention.

The guide main body part 100 is a member coupled to one side of the sliding basket which moves in and out of the dishwasher to move integrally with the sliding basket.

The guide main body part 100 has a relatively narrow width, and may have two surfaces having a predetermined cross-sectional area wherein one side surface is coupled to one side of the sliding basket and the other side is coupled to the upper support roller part 400 and the lower support roller part 500.

The upper support roller part 400 and the lower support roller part 500 are respectively coupled to positions spaced apart from each other on one surface of the guide main body part 100, and may be formed in a rotatable cylindrical shape with respect to an axis perpendicular to one surface of the guide main body part 100 as the central axis.

The guide main body part 100 and the sliding basket are supported by a load by the guide rail part 200 inserted into a space between the upper support roller part 400 and the lower support roller part 500 while guiding sliding at the same time.

As illustrated, the upper support roller part 400 may be formed with a concave part having a predetermined depth along the circumference direction of the central axis. The concave part is formed to correspond to the upper guide part 210 of the guide rail part 200 which will be described in the following.

At this time, the concave part of the upper support roller part 400 according to an embodiment of the present invention may be formed to have a cross section gradually narrowing along the depth direction while being symmetrical with respect to the center along the circumference direction. In this case, since the concave part encloses the outer circumference surface of the upper guide part 210, the load can be stably supported while the upper support roller part 400 is fastened to the guide rail part 200.

On the other hand, a plurality of upper support roller parts 400 may be formed on one surface of the guide main body part 100. In this case, the load of the sliding basket and the guide main body part 100 may be supported in a dispersed state according to the number and position of the plurality of upper support roller parts 400.

Similarly, the lower support roller part 500 may be formed with a concave part having a predetermined depth along the circumference direction of the central axis. The concave part is formed to correspond to the lower guide part 220 of the guide rail part 200 which will be described in the following.

At this time, the concave part of the lower support roller part 500 according to an embodiment of the present invention may be formed to have a cross section gradually narrowing along the depth direction while being symmetrical with respect to the center along the circumference direction. In this case, since the concave part encloses the outer circumference surface of the lower guide part 220, the load can be stably supported while the lower support roller part 500 is fastened to the guide rail part 200.

One side of the rack roller part 300 is inserted into the guide rail part 200, and the other side is fixedly coupled to one surface of the inner wall of the main body of the dishwasher.

In other words, one side of the rack roller part 300 is inserted into the rail of the guide rail part 200 to serve the role of guiding or stopping the sliding in the entry/exit direction of the sliding basket which moves integrally with the guide rail part 200.

The other side of the rack roller part 300 is fixedly coupled to one surface of the inner wall of the dishwasher, and serves the role of supporting the load from the sliding basket. In particular, in order to stably support the sliding basket, a plurality of rack roller parts 300 may be formed. In other words, a plurality of rack roller parts 300 may be formed being spaced apart from each other at a predetermined interval, and at this time, the angle formed between each rack roller part 300 determines the entry/exit direction of the sliding basket.

One side of the guide rail part 200 is inserted into a space between the upper support roller part 400 and the lower support roller part 500. At this time, the guide rail part 200 receives the load of the sliding basket by the upper support roller part 400, and is supported by the rack roller part 300 inserted into the rail of the guide rail part 200.

When the guide rail part 200 is constrained to the guide main body part 100, the guide rail part 200 may move integrally, and needs to be formed in a length that can open and close the sliding basket sufficiently.

More specifically, the guide rail part 200 may be formed to comprise an upper guide part 210, a lower guide part 220, a front locking part 240 and a rear locking part 250.

The front locking part 240 and the rear locking part 250 are respectively formed at both the front and rear ends of the guide rail part 200. The front locking part 240 and the rear locking part 250 serve the role of constraining the guide rail part 200 to the guide main body part 100, while colliding into the rack roller part 300 inserted into the rail to serve the role of a stopper stopping the sliding of the guide rail part 200.

At this time, the front locking part 240 and the rear locking part 250 comprise a shape locked to the upper support roller part 400 or the lower support roller part 500.

As illustrated in the drawings, the front locking part 240 and the rear locking part 250 according to an embodiment of the present invention may comprise a protruding ring part to enclose the cylindrical shape of the upper support roller part 400. In addition, the front locking part 240 and the rear locking part 250 may have various shapes locked to the upper support roller part 400 or the lower support roller part 500.

As illustrated, the guide rail part 200 may be formed in a structure having a "C" shape cross-section.

The upper guide part 210 is formed to correspond to the shape of the circumference surface of the upper support roller part 400, and is configured to slide in a state corresponding to the concave part formed along the circumference of the upper support roller part 400.

In this case, the upper guide part 210 is configured to be connected to the upper part of a middle guide part 230 which will be described in the following.

The lower guide part 220 is formed to be seated on the circumference surface of the lower support roller part 500, and is configured to slide in a state seated in the concave part formed along the circumference of the lower support roller part 500.

Similarly, the lower guide part 220 is configured to be connected to the lower part of a middle guide part 230 which will be described in the following.

The guide rail part 200 according to an embodiment of the present invention may further comprise a middle guide part 230 connecting the upper guide part 210 and the lower guide part 220. The middle guide part 230 may be formed to be spaced apart from the rack roller part 300 inserted into the guide rail part 200 by a predetermined interval so as to form a predetermined gap between the guide rail part 200 and the rack roller part 300.

As a predetermined gap is formed between the middle guide part 230 and the rack roller part 300 according to an embodiment of the present invention, a more smooth drainage function may be achieved.

Hereinafter, a detailed operation method and function of the rail device 1000 for dishwasher according to an embodiment of the present invention with the above structure will be described in detail with reference to FIG. 2.

In a state wherein a sliding basket is inserted into the dishwasher, one side 300a of the rack roller part is positioned to be in contact with the front locking part 240, and one side 400b of the upper support roller part is positioned to be in contact with the locking part of the rear locking part 250. Then, the sliding basket is slid in the drawing-out direction by the user's operation.

Thereafter, the guide main body part 100 integrally coupled to the sliding basket moves in the drawing-out direction together, and slides from the rear locking part 250 side to the front locking part 240 side by the guidance of the guide rail part 200. Then, the other side 400a of the upper support roller comes into contact with the locking part of the front locking part 240, so that the guide main body part 100 is constrained to the guide rail part 200.

Thereafter, the guide rail part 200 moves in the drawing-out direction integrally with the sliding basket by the guide main body part 100, and the other side 300b of the rack roller part inserted into the rail of the guide rail part 200 gets closer to the rear locking part 250 side. Then, the other side 300b of the rack roller part collides with the rear locking part 250, thereby stopping the sliding of the sliding basket and preventing the sliding basket from being separated from the dishwasher.

However, the sliding order of the guide main body part 100 and the guide rail part 200 in the process of drawing out the sliding basket is not limited to the above, and the sliding order may vary depending on the specific design of the dishwasher to which the present invention is applied, or the degree of pulling when the user draws out the sliding basket. For example, the guide main body part 100 and the guide rail part 200 may slide out at the same time starting from first being drawn out, or the guide main body part 100 may slide out later after the guide rail part 200 starts sliding.

Figure 5:
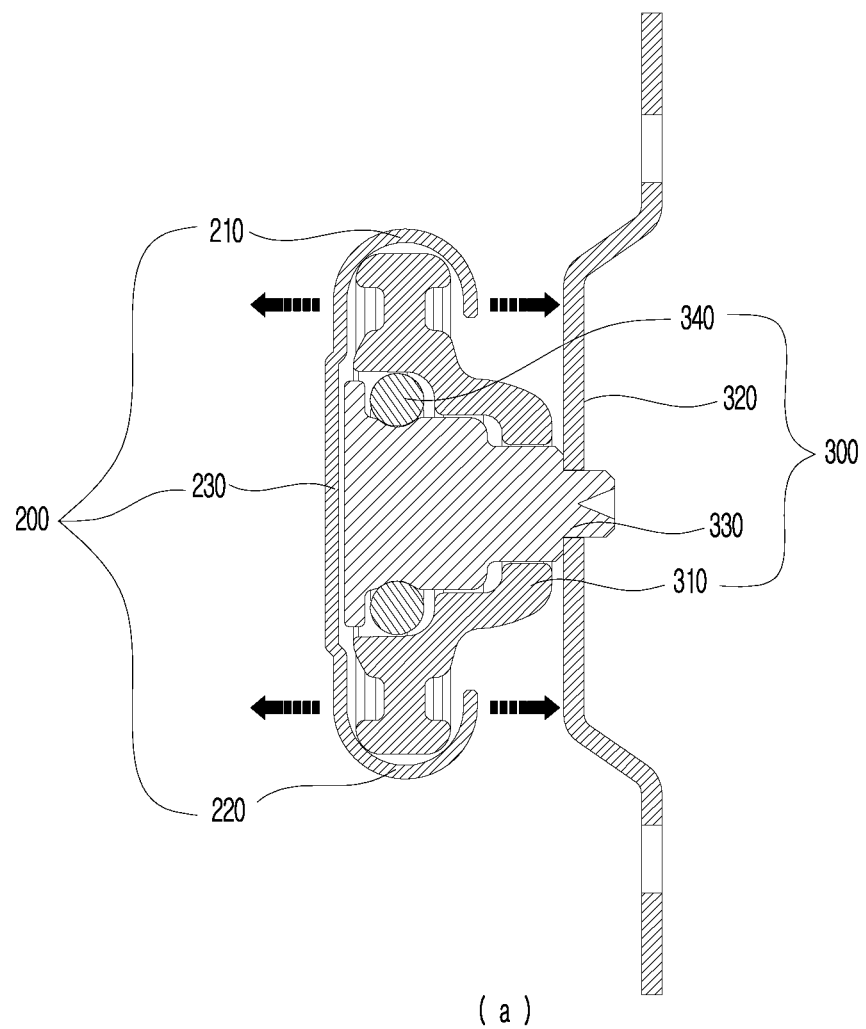
FIG. 5 shows a cross-sectional view of a rack roller part and a perspective view of a rack coupling part according to an embodiment of the present invention, respectively.
Figure 5:
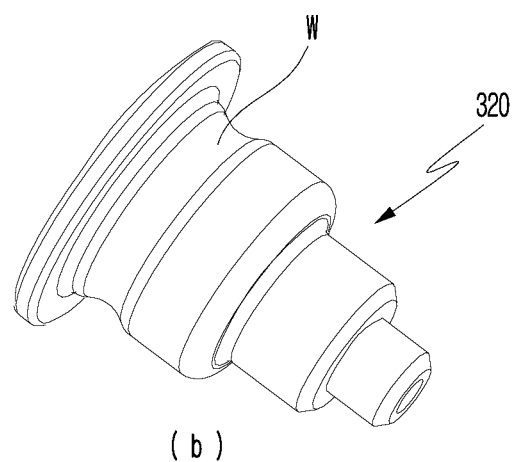

FIG. 5 shows a cross-sectional view of a rack roller part and a perspective view of a rack coupling part according to an embodiment of the present invention, respectively.

As illustrated in FIG. 5, the rack roller part 300 according to an embodiment of the present invention may comprise a rack roller main body part 310, a rack member part 320 and a rack coupling part 330.

The rack roller main body part 310 guides the sliding of the guide rail part 200 while being inserted into the guide rail part 200. The rack roller main body part 310 has a shape that can be inserted between the upper guide part 210 and the lower guide part 220, and the inside may be penetratingly formed so that the rack coupling part 330 is coupled along the central axis.

The rack member part 320 has one side fixedly coupled to the inner wall of the main body of the dishwasher to support a load. More specifically, the rack member part 320 according to an embodiment of the present invention has a bent shape wherein a central part protrudes from an outer part by a predetermined height, and the rack coupling part 330 is penetratingly coupled to the central part. At this time, the outer part of the rack member part 320 may be coupled to the inner wall of the body of the dishwasher. However, the shape of the rack member part 320 is not limited to the above bent shape, and it is obvious that various other shapes may be applied.

A part of the rack coupling part 330 is formed inside the rack roller main body part 310 and penetrates the central axis of the rack roller main body part 310 and the central part of the rack member part 320, so as to couple the rack roller main body part 310 and the rack member part 320. At this time, the rack coupling part 330 couples the rack roller main body part 310 and the rack member part 320 being spaced apart from each other, so that the rack roller part 300 may be moved horizontally by a predetermined distance.

In other words, as illustrated in FIG. 5, the rack roller part 300 may absorb the horizontal movement or impact from the sliding basket by spacing the rack coupling part 330 apart from the rack roller main body part 310 so as to form a predetermined width allowing the rack roller part 300 to move horizontally.

To this end, preferably, the rack coupling part 330 is formed so that the cross-sectional area of the part penetrating the rack roller main body part 310 is larger than the cross-sectional area of the part penetrating the rack member part 320.

The rack roller part 300 according to an embodiment of the present invention is characterized by further comprising a bearing ball 340.

One or more bearing balls 340 are disposed along the outer circumference surface of the rack coupling part 330 in a space between the inner circumference surface of the rack roller main body part 310 and the outer circumference surface of the rack coupling part 330. The bearing ball 340 may absorb the horizontal movement or impact of the sliding basket in the bearing itself.

For the same purpose, the inner circumference surfaces of the bearing ball 340 and the rack roller main body part 310 according to an embodiment of the present invention are spaced apart from each other so that the rack roller part 300 may be moved horizontally by a predetermined distance.

Meanwhile, according to an embodiment, a track part W on which the bearing ball 340 can be seated may be provided in any one of the inner circumference surface of the rack roller main body part 310 and the outer circumference surface of the rack coupling part 330.

The bearing ball 340 is in point contact with the inner circumference surface of the rack roller main body part 310 or the outer circumference surface of the rack coupling part 300 while being seated on the track part W, thereby stably serving as a bearing. Accordingly, even if there is no additional retainer member, the operability of the rack roller part 300 may be improved and manufacturing costs may be saved due to the reduction of the number of parts.

Additionally, the track part W is formed in any one of the inner circumference surface of the rack roller main body part 310 and the outer circumference surface of the rack coupling part 330, thereby preventing a situation that the bearing ball 340 is jammed in the track part W resulting in a decrease in operability.

Figure 6:
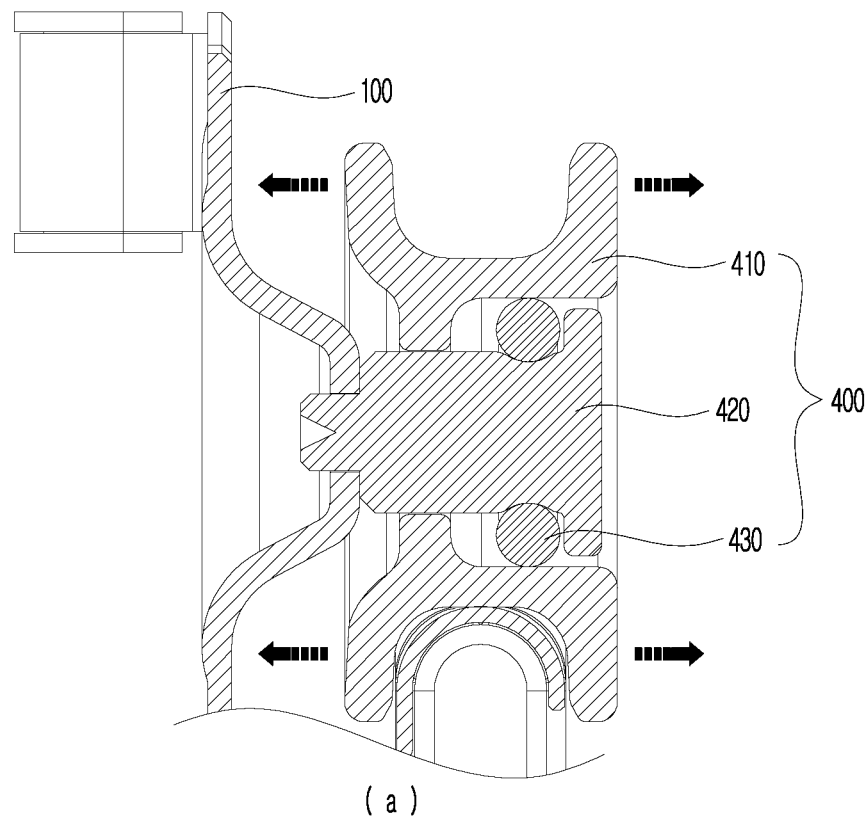
FIG. 6 shows a cross-sectional view of an upper support roller part and a perspective view of a first roller coupling part according to an embodiment of the present invention, respectively.
Figure 6:
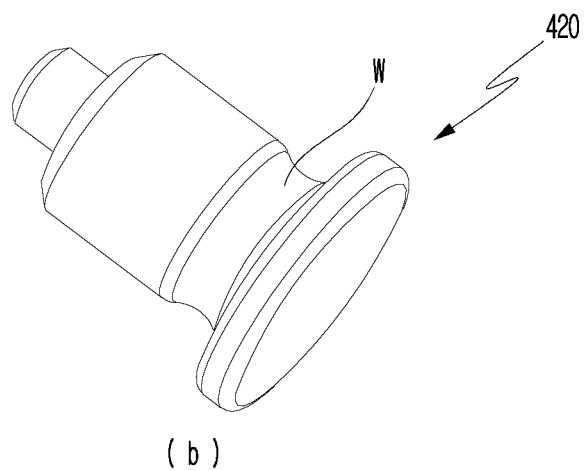

FIG. 6 shows a cross-sectional view of an upper support roller part and a perspective view of a first roller coupling part according to an embodiment of the present invention, respectively.

As illustrated in FIG. 6, the upper support roller part 400 according to an embodiment of the present invention may comprise a first roller frame part 410 and a first roller coupling part 420.

The first roller frame part 410 is formed with a concave part corresponding to the shape of the upper guide part 210 along the circumference direction on the outer circumference surface, and is rotatable with respect to the central axis and slides along the guide rail part 200.

A part of the first roller coupling part 420 is accommodated in the first roller frame part 410 and penetrates the central axis of the first roller frame part 410 and one side of the guide main body part 100, so as to couple the first roller frame part 410 and the guide main body part 100. In addition, the first roller coupling part 420 serves as a rotation axis of the first roller frame part 410.

At this time, the first roller coupling part 420 couples the first roller frame part 410 and the guide main body part 100 while being spaced apart from each other so that the upper support roller part 400 may be moved horizontally by a predetermined distance.

In other words, as illustrated in FIG. 6, the upper support roller part 400 may absorb the horizontal movement or impact from the sliding basket by spacing the guide main body part 100 apart from the first roller frame part 410 so as to form a predetermined width allowing the upper support roller part 400 to move horizontally.

To this end, preferably, the first roller coupling part 420 is formed so that the cross-sectional area of the part penetrating the first roller frame part 410 is larger than the cross-sectional area of the part penetrating one side of the guide main body part 100.

The upper support roller part 400 according to an embodiment of the present invention is characterized by further comprising a bearing ball 430.

One or more bearing balls 430 are disposed along the outer circumference surface of the first roller coupling part 420 in a space between the inner circumference surface of the first roller frame part 410 and the outer circumference surface of the first roller coupling part 420. At this time, the bearing ball 430 may absorb the horizontal movement or impact of the sliding basket in the bearing itself.

For the same purpose, the inner circumference surfaces of the bearing ball 430 and the first roller frame part 410 according to an embodiment of the present invention are spaced apart so that the upper support roller part 400 may be moved horizontally by a predetermined distance.

Meanwhile, according to an embodiment, a track part W on which the bearing ball 430 can be seated may be provided in any one of the inner circumference surface of the first roller frame part 410 and the outer circumference surface of the first roller coupling part 420.

The bearing ball 430 is in point contact with the inner circumference surface of the first roller frame part 410 or the outer circumference surface of the first roller coupling part 420 while being seated on the track part W, thereby stably serving as a bearing. Accordingly, even if there is no additional retainer member, the operability of the upper support roller part 400 may be improved and manufacturing costs may be saved due to the reduction of the number of parts.

Additionally, the track part W is formed in any one of the inner circumference surface of the first roller frame part 410 and the outer circumference surface of the first roller coupling part 420, thereby preventing a situation that the bearing ball 430 is jammed in the track part W resulting in a decrease in operability.

Figure 7:
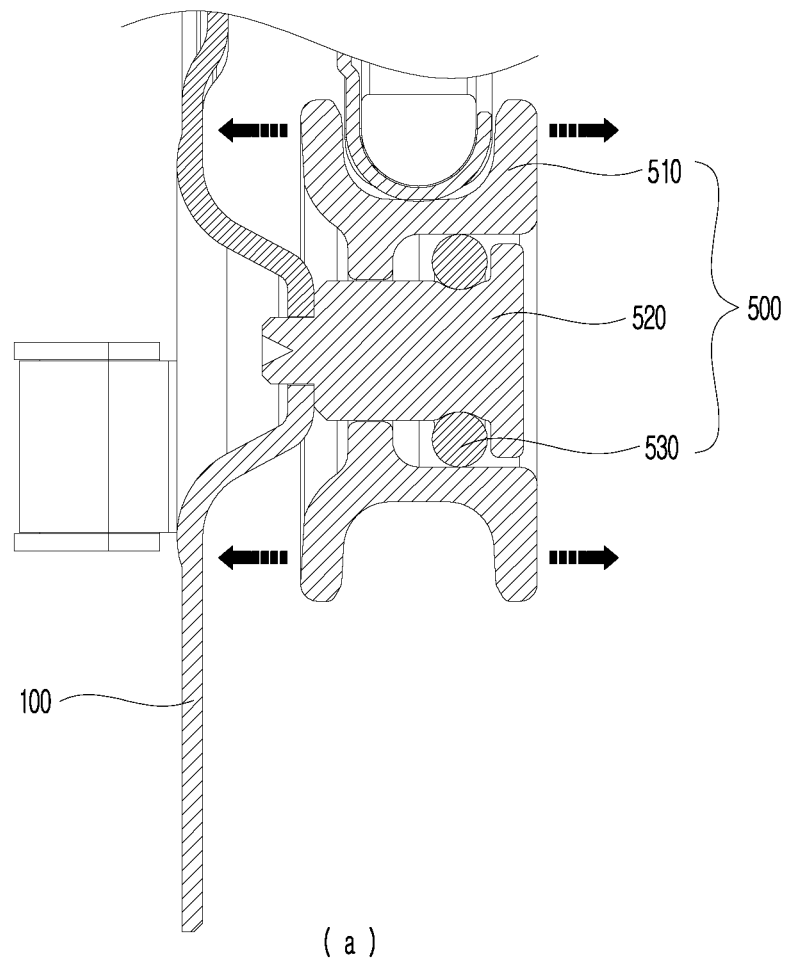
FIG. 7 shows a cross-sectional view of a lower support roller part and a perspective view of a second roller coupling part according to an embodiment of the present invention, respectively.
Figure 7:
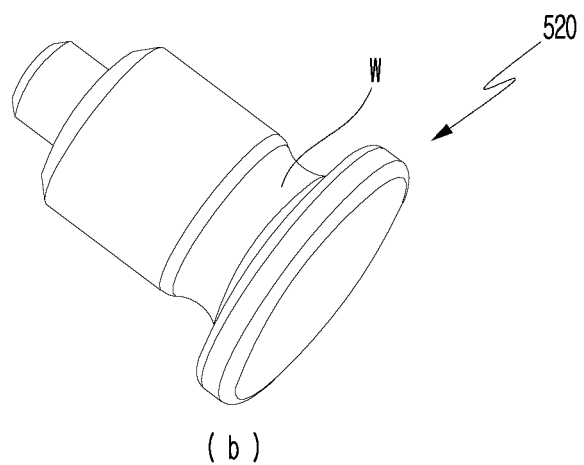

FIG. 7 shows a cross-sectional view of a lower support roller part and a perspective view of a second roller coupling part according to an embodiment of the present invention, respectively.

As illustrated in FIG. 7, the lower support roller part 500 according to an embodiment of the present invention may comprise a second roller frame part 510 and a second roller coupling part 520.

The second roller frame part 510 is formed with a concave part corresponding to the shape of the lower guide part 220 along the circumference direction on the outer circumference surface, and is rotatable with respect to the central axis and slides along the guide rail part 200.

Meanwhile, the second roller frame part 510 is rotatable with respect to the central axis and slides along the guide rail part 200 while the outer circumference surface thereof corresponds to the lower guide part 220 along the circumference direction.

A part of the second roller coupling part 520 is accommodated in the second roller frame part 510 and penetrates the central axis of the second roller frame part 510 and one side of the guide main body part 100, so as to couple the second roller frame part 510 and the guide main body part 100. In addition, the second roller coupling part 520 serves as a rotation axis of the second roller frame part 510.

At this time, the second roller coupling part 520 couples the second roller frame part 510 and the guide main body part 100 while being spaced apart from each other so that the lower support roller part 500 may be moved horizontally by a predetermined distance.

In other words, as illustrated in FIG. 7, the lower support roller part 500 may absorb the horizontal movement or impact from the sliding basket by spacing the guide main body part 100 apart from the second roller frame part 510 so as to form a predetermined width allowing the lower support roller part 500 to move horizontally.

To this end, preferably, the second roller coupling part 520 is formed so that the cross-sectional area of the part penetrating the second roller frame part 510 is larger than the cross-sectional area of the part penetrating one side of the guide main body part 100.

The lower support roller part 500 according to an embodiment of the present invention is characterized by further comprising a bearing ball 530.

One or more bearing balls 530 are disposed along the outer circumference surface of the second roller coupling part 520 in a space between the inner circumference surface of the second roller frame part 510 and the outer circumference surface of the second roller coupling part 520. The bearing ball 530 may absorb the horizontal movement or impact of the sliding basket in the bearing itself.

For the same purpose, the inner circumference surfaces of the bearing ball 530 and the second roller frame part 510 according to an embodiment of the present invention are spaced apart so that the lower support roller part 500 may be moved horizontally by a predetermined distance.

Meanwhile, according to an embodiment, a track part W on which the bearing ball 530 can be seated may be provided in any one of the inner circumference surface of the second roller frame part 510 and the outer circumference surface of the second roller coupling part 520.

The bearing ball 530 is in point contact with the inner circumference surface of the second roller frame part 510 or the outer circumference surface of the second roller coupling part 520 while being seated on the track part W, thereby stably serving as a bearing. Accordingly, even if there is no additional retainer member, the operability of the lower support roller part 500 may be improved and manufacturing costs may be saved due to the reduction of the number of parts.

Additionally, the track part W is formed in any one of the inner circumference surface of the second roller frame part 510 and the outer circumference surface of the second roller coupling part 520, thereby preventing a situation that the bearing ball 530 is jammed in the track part W resulting in a decrease in operability.

Meanwhile, according to an embodiment, a structure in which bearing balls 340, 430, 530 are inserted into roller structures 300, 400, 500 applies only to at least one of the rack roller part 300, the upper support roller part 400 and the lower support roller part 500, and a general structure of face-to-face friction may be applied to other roller structures. Accordingly, it may prevent the reduction of user's convenience, such as deviating from the sliding scope intended by the user, which is caused by too smooth sliding operation within the rail device 1000 for a dishwasher.

The foregoing description of the present invention has been presented for illustrative purposes, and it is apparent to a person having ordinary skill in the art that the present invention can be easily modified into other detailed forms without changing the technical idea or essential features of the present invention. Therefore, it should be understood that the forgoing embodiments are by way of example only, and are not intended to limit the present disclosure. For example, each component which has been described as a unitary part can be implemented as distributed parts. Likewise, each component which has been described as distributed parts can also be implemented as a combined part.

The scope of the present invention is presented by the accompanying claims, and it should be understood that all changes or modifications derived from the definitions and scopes of the claims and their equivalents fall within the scope of the present invention.

DESCRIPTION OF REFERENCE NUMERALS 1000 rail device for dishwasher
100 guide main body part
200 guide rail part
210 upper guide part
220 lower guide part
230 middle guide part
240 front locking part
250 rear locking part
300 rack roller part
310 rack roller main body part
320 rack member part
330 rack coupling part
340 bearing ball
400 upper support roller part
410 first roller frame part
420 first roller coupling part
430 bearing ball
500 lower support roller part
510 second roller frame part
520 second roller coupling part
530 bearing ball

What is claimed is:

1. A rail device for a dishwasher, comprising:
a guide main body part;
an upper support roller part coupled to one side of the guide main body part to be rotatable with respect to a central axis;
a lower support roller part coupled to one side of the guide main body part to be rotatable with respect to a central axis;
a guide rail part extendedly formed along the sliding direction with one side inserted into a space between the upper support roller part and the lower support roller part; and
a rack roller part having one side inserted into the guide rail part and the other side coupled to one surface inside the main body of the dishwasher or coupled to a sliding basket,
wherein the rack roller part comprises:
a rack roller main body part inserted into the guide rail part to be rotatable with respect to the central axis;
a rack member part fixedly coupled to one surface inside the main body of the dishwasher; and
a rack coupling part penetrating and coupling the center of the rack roller main body part and one side of the rack member part,
wherein the roller main body part and the rack member part are coupled and spaced apart by the rack coupling part, so that the rack roller part moves horizontally by a predetermined distance.

2. The rail device of claim 1, wherein at least one of the upper support roller part, the lower support roller part and the rack roller part comprises one or more bearing balls thereinside.

3. The rail device of claim 2, wherein the one or more bearing balls are disposed in a space between an inner circumference surface of the rack roller main body part and an outer circumference surface of the rack coupling part, and are spaced apart from the inner circumference surface of the rack roller main body part so that the rack roller part moves horizontally by a predetermined distance.

4. The rail device of claim 3, wherein a track part on which the one or more bearing balls can be seated is provided in any one of the inner circumference surface of the rack roller main body part and the outer circumference surface of the rack coupling part.

5. A rail device for a dishwasher, comprising:
a guide main body part;
an upper support roller part coupled to one side of the guide main body part to be rotatable with respect to a central axis;
a lower support roller part coupled to one side of the guide main body part to be rotatable with respect to a central axis;
a guide rail part extendedly formed along the sliding direction with one side inserted into a space between the upper support roller part and the lower support roller part; and a rack roller part having one side inserted into the guide rail part and the other side coupled to one surface inside the main body of the dishwasher or coupled to a sliding basket, wherein the rack roller part comprises:

a rack roller main body part inserted into the guide rail part to be rotatable with respect to the central axis;

a rack member part fixedly coupled to one surface inside the main body of the dishwasher; and a rack coupling part penetrating and coupling the center of the rack roller main body part and one side of the rack member part, and wherein the upper support roller part comprises:

a first roller frame part rotatable with respect to the central axis, whose circumference surface is formed to correspond to an upper guide part of the guide part rail; and a first roller coupling part penetrating and coupling the center of the first roller frame part and one side of the guide main body part, wherein the first roller frame part and the guide main body part are coupled and spaced apart by the first roller coupling part, so that the upper support roller part move horizontally by a predetermined distance.

6. The rail device of claim 5, wherein at least one of the upper support roller part, the lower support roller part and the rack roller part comprises one or more bearing balls thereinside.

7. The rail device of claim 6, wherein the one or more bearing balls are disposed in a space between an inner circumference surface of the first roller frame part and an outer circumference surface of the first roller coupling part, and are spaced apart from the inner circumference surface of the first roller frame part so that the upper support roller part moves horizontally by a predetermined distance.

8. The rail device of claim 7, wherein a track part on which the one or more bearing balls can be seated is provided in any one of the inner circumference surface of the first roller frame part and the outer circumference surface of the first roller coupling part.

9. A rail device for a dishwasher, comprising:

a guide main body part;

an upper support roller part coupled to one side of the guide main body part to be rotatable with respect to a central axis;

a lower support roller part coupled to one side of the guide main body part to be rotatable with respect to a central axis;

a guide rail part extendedly formed along the sliding direction with one side inserted into a space between the upper support roller part and the lower support roller part; and a rack roller part having one side inserted into the guide rail part and the other side coupled to one surface inside the main body of the dishwasher or coupled to a sliding basket, wherein the rack roller part comprises:

a rack roller main body part inserted into the guide rail part to be rotatable with respect to the central axis;

a rack member part fixedly coupled to one surface inside the main body of the dishwasher; and a rack coupling part penetrating and coupling the center of the rack roller main body part and one side of the rack member part, and wherein the lower support roller part comprises:

a second roller frame part rotatable with respect to the central axis, whose circumference surface is formed to correspond to a lower guide part of the guide rail part; and a second roller coupling part penetrating and coupling the center of the second roller frame part and one side of the guide main body part, wherein the second roller frame part and the guide main body part are coupled spaced apart by the second roller coupling part, so that the lower support roller part moves horizontally by a predetermined distance.

10. The rail device of claim 9, wherein at least one of the upper support roller part, the lower support roller part and the rack roller part comprises one or more bearing balls thereinside.

11. The rail device of claim 10, wherein the one or more bearing balls are disposed in a space between an inner circumference surface of the second roller frame part and an outer circumference surface of the second roller coupling part, and are spaced apart from the inner circumference surface of the second roller frame part so that the lower support roller part moves horizontally by a predetermined distance.

12. The rail device of claim 11, wherein a track part on which the one or more bearing balls can be seated is provided in any one of the inner circumference surface of the second roller frame part and the outer circumference surface of the second roller coupling part.

\* \* \* \* \*